United States Patent
Yoshiba

(10) Patent No.: US 8,110,310 B2
(45) Date of Patent: Feb. 7, 2012

(54) POWER GENERATING PLANT

(75) Inventor: Fumihiko Yoshiba, Yokosuka (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 372 days.

(21) Appl. No.: 12/518,512

(22) PCT Filed: Jan. 28, 2008

(86) PCT No.: PCT/JP2008/051202
§ 371 (c)(1),
(2), (4) Date: Jun. 10, 2009

(87) PCT Pub. No.: WO2008/096623
PCT Pub. Date: Aug. 14, 2008

(65) Prior Publication Data
US 2010/0015486 A1    Jan. 21, 2010

(30) Foreign Application Priority Data
Feb. 7, 2007 (JP) .................. PCT/JP2007/052152

(51) Int. Cl.
*H01M 8/04* (2006.01)
*H01M 8/06* (2006.01)
(52) U.S. Cl. .............. 429/408; 429/411; 429/472
(58) Field of Classification Search ............. 429/400, 429/408, 411, 472
See application file for complete search history.

(56) References Cited

U.S. PATENT DOCUMENTS

| 4,851,497 A | 7/1989 | Wakui et al. |
| 4,900,804 A | 2/1990 | Wakui et al. |
| 6,106,963 A * | 8/2000 | Nitta et al. ............ 429/513 |
| 2002/0142208 A1 | 10/2002 | Keefer et al. |

FOREIGN PATENT DOCUMENTS

| JP | 62-119870 | 6/1987 |
| JP | 63-119163 | 5/1988 |
| JP | 63-126173 | 5/1988 |
| JP | 63-174282 | 7/1988 |
| JP | 63-190258 | 8/1988 |
| JP | 04-65066 | 3/1992 |

(Continued)

OTHER PUBLICATIONS

IPDL Machine Translation of the Detailed Description of JP 11-312527A (Nov. 1999).*

Primary Examiner — Gregg Cantelmo
(74) Attorney, Agent, or Firm — Young & Thompson

(57) ABSTRACT

Coal is reacted in a furnace 22 to obtain a coal gasification gas. The coal gasification gas is cooled by a gas cooler 23, passed through a porous filter 24, and desulfurized by a desulfurizer 25 to produce a CO-containing gas as an anode. The CO gas-containing gas is subjected to an exothermic reaction in a shift reactor 26 to form $H_2$ and $CO_2$, and the anode gas containing $H_2$ is supplied to an anode 7 of MCFC 2. Thus, in the absence of an extra heat source and a heat exchange source, a desired anode gas is obtained from the coal gasification gas, and with heat buildup of the MCFC 2 being inhibited and its performance being maintained, reduction of $CO_2$ is taken into consideration. A power generating plant equipped with the MCFC 2 capable of using a coal gasification fuel substantially containing a CO gas is thus achieved.

2 Claims, 4 Drawing Sheets

FOREIGN PATENT DOCUMENTS

| | | |
|---|---|---|
| JP | 04-137365 | 5/1992 |
| JP | 11-135139 | 5/1999 |
| JP | 11-312527 | 11/1999 |
| JP | 2000-048844 | 2/2000 |
| JP | 2000-212580 | 8/2000 |
| JP | 2002-093452 | 3/2002 |
| JP | 2003-036876 | 2/2003 |
| JP | 2003-317784 | 11/2003 |
| JP | 2004-512665 | 4/2004 |
| JP | 2004-196611 | 7/2004 |

* cited by examiner

FIG.2

| Output of MCFC 2 (kW) | 262097.2706 | Gross HHV | 0.665259728 | Uf | | 0.9 | CO$_2$ partial pressure | 14.6992151 |
|---|---|---|---|---|---|---|---|---|
| Gross output of turbine (kW) | 83717.61558 | Gross LHV | | Uo2 | | 0.091561472 | Ca Re | 0.988801157 |
| S/T output (kW) | 71724.3444 | Net HHV | 0.54772941 | Ucco2 | | 0.091561472 | Gasification furnace air ratio | 0.382536925 |
| Gross power of compressor 13 (kW) | 2627.353708 | Net LHV | | | Current density | 2000 | Cold gas efficiency | 0.83724045 |
| Gross power of compressor 28 for coal transport (kW) | 22296.00668 | Quantity of heat charged | 139930.8189 | Cell voltage | | 0.919639546 | Hot gas efficiency | 0.979079993 |
| Anode blower power (kW) | 0 | MCFC output ratio | 0.824330165 | | | | | |
| Cathode blower power (kW) | 2215.075767 | Gasification oxygen production power (kW) | 21035.19121 | | | | | |
| Pump power (kW) | 1230.595352 | Cathode oxygen production power (kW) | 32647.5618 | | | | | |
| Output of turbine 4 (kW) | 55854.54243 | | | | | | | |

FIG.3

| Breakdown of calorific values | rate(-) | Quantity of heat (kW) | Sum of outputs |
|---|---|---|---|
| Calorific value (HHV) of fuel | | 585750.408 | 66.53% |
| Output of MCFC 2 (kW) | 44.75% | 262097.2706 | |
| Output of turbine 4 | 9.54% | 55854.54243 | |
| S/T output (kW) | 12.24% | 71724.3444 | |

FIG.4

| Breakdown of heat losses | rate(-) |
|---|---|
| Heat loss of coal gasification furnace 22 | 2.00% |
| Heat loss of porous filter 24 | 0.07% |
| Heat loss of desulfurizer 25 | 0.48% |
| Loss of cathode blower | 0.02% |
| Mechanical loss of turbine 4 | 0.50% |
| Heat loss of HRSG 9 | 0.97% |
| Condenser loss | 17.80% |
| Exhaust gas loss | 0.00% |
| S/T mechanical loss | 0.64% |
| Pump power | 0.28% |
| Plant accessories power | 2.00% |
| Gasification oxygen production power | 3.59% |
| Cathode oxygen production power | 5.57% |
| Waste heat of condenser 12 | 8.60% |
| Inverter loss | 2.36% |
| Heat loss of MCFC 2 | 0.48% |

POWER GENERATING PLANT

TECHNICAL FIELD

This invention relates to a power generating plant equipped with a molten carbonate fuel cell which obtains electric power by an electrochemical reaction between hydrogen and oxygen.

BACKGROUND ART

A molten carbonate fuel cell (MCFC), which obtains electric power by an electrochemical reaction between hydrogen and oxygen, is constituted by interposing an electrolyte (carbonate) between a fuel electrode (anode), for example, formed from a nickel porous material and an air electrode (cathode), for example, formed from a nickel oxide porous material. In the MCFC, hydrogen ($H_2$) obtained from a fuel, such as a natural gas, is supplied to the anode, while air ($O_2$) and carbon dioxide ($CO_2$) are supplied to the cathode, whereupon power generation is performed by an electrochemical reaction between $H_2$ and $O_2$. The MCFC is characterized, for example, by having a high efficiency because of its operation at high temperatures, and by minimally affecting the environment because of its ability to recover and separate $CO_2$. In recent years, therefore, the MCFC has been drawing attention as a power generation system following water power, thermal power, and nuclear power.

Since the MCFC operates at high temperatures, moreover, the MCFC may be configured to supply its exhaust to a combustor of a gas turbine. Based on this configuration, a power generating plant combining MCFC and a gas turbine (i.e., combined power generation equipment) has hitherto been proposed (see, for example, Patent Document 1) The combined power generation equipment comprising the MCFC gas turbine combination enables the MCFC and the gas turbine to perform power generation.

With the MCFC which obtains electric power by an electrochemical reaction between hydrogen and oxygen, it is conceivable to obtain a hydrogen gas by reforming a fuel gas, such as a natural gas, in order to acquire hydrogen as a fuel. On the other hand, various technologies have been proposed for gasifying coal, which is supplied highly stably and whose price per unit calorific value is low, to use the resulting gas as a fuel for a fuel cell (see, for example, Patent Document 2).

However, the fuel cell using the gas from coal as the fuel is mainly a solid oxide fuel cell (SOFC) operating at high temperatures. In the field of MCFC capable of operation with high efficiency, no technologies for gasifying coal and using the resulting gas as a fuel have been established. Nowadays, coal has a larger amount of $CO_2$ emission per unit calorific value than does a natural gas, so that a plant giving consideration to the reduction of $CO_2$ needs to be constructed. Actually, there has been a demand for the realization of a plant using a fuel produced by gasification of coal (may hereinafter be referred to as a coal gasification fuel), while maintaining the performance of MCFC and taking the reduction of $CO_2$ into consideration.

The same can be said of the use of a gas obtained by gasification of not only coal, but also a source other than a natural gas, including, for example, a gas upon gasification (may hereinafter be referred to as a gasification gas) which has resulted from the combustion of a solid fuel such as biomass; or a gasification gas resulting from the combustion of a liquid fuel such as gasoline or light oil; namely, a gas substantially containing a CO gas. Even with the use of such a CO gas-containing gas, there has been a demand for the realization of a plant which takes the reduction of $CO_2$ into consideration while maintaining the performance of MCFC.

Patent Document 1: JP-A-11-135139
Patent Document 2: JP-A-2000-48844

DISCLOSURE OF THE INVENTION

Problems to be Solved by the Invention

The present invention has been accomplished in the light of the above-described situations. It is an object of the invention to provide a power generating plant equipped with a molten carbonate fuel cell capable of using a CO gas-containing gas, which is a gas substantially containing a CO gas, especially, a coal gasification fuel, while giving consideration to the reduction of $CO_2$ emissions, with the heat buildup of the molten carbonate fuel cell (MCFC) being inhibited and the performance of the MCFC being maintained.

Means for Solving the Problems

The power generating plant of the present invention according to claim 1, intended for attaining the above object, is a power generating plant, comprising: anode gas generation means for generating a CO gas-containing gas, which substantially contains a CO gas, as an anode gas; cathode gas generation means for generating pure oxygen and a $CO_2$ gas as a cathode gas; a molten carbonate fuel cell which has an anode supplied with the anode gas generated by the anode gas generation means, which has a cathode supplied with the cathode gas, and which performs power generation by an electrochemical reaction between the anode gas and the cathode gas; and cooling function means provided on an inlet side of the anode to suppress an exothermic reaction in the molten carbonate fuel cell, and adapted to obtain an $H_2$-rich gas from the CO gas-containing gas.

According to the above feature, a $CO_2$ gas of an exhaust from the molten carbonate fuel cell can be recovered, and formed as the cathode gas. Even when a minimum amount of the cathode gas is used, there is provided the power generating plant equipped with the molten carbonate fuel cell capable of substantially using a CO gas-containing gas, while inhibiting heat buildup of the MCFC to exert no influence on its performance, and ensuring the circulation of $CO_2$.

The power generating plant of the present invention according to claim 2 is the power generating plant according to claim 1, characterized in that the cooling function means is a shift reaction instrument for converting the CO gas-containing gas into $H_2$ and $CO_2$ by a chemical reaction, and the shift reaction instrument, which causes an exothermic reaction, is provided outside the molten carbonate fuel cell to perform relative cooling.

According to the above feature, the provision of the shift reaction instrument eliminates an exothermic reaction due to a shift reaction within the molten carbonate fuel cell to carry out relative cooling The shift reaction instrument enables the CO gas-containing gas to be converted into $H_2$ and $CO_2$ by an exothermic reaction, and makes it possible to obtain a desired anode gas in the absence of an extra heat source and a heat exchange source. The shift reaction instrument can also trap unremovable foreign matter contained in the CO gas-containing gas.

The power generating plant of the present invention according to claim 3 is the power generating plant according to claim 2, characterized in that the $CO_2$ gas generated by the cathode gas generation means is a $CO_2$ gas recovered by cooling an exhaust gas, which has finished work in the molten carbonate fuel cell, to separate water.

According to the above feature, a $CO_2$ gas of the exhaust from the molten carbonate fuel cell can be recovered and produced as the cathode gas.

The power generating plant of the present invention according to claim 4 is the power generating plant according to claim 2 or 3, characterized in that the anode gas generation means is gasification equipment for generating the CO gas-containing gas as the anode gas.

According to the above feature, the CO gas-containing gas produced by the gasification equipment can be formed as the anode gas.

The power generating plant of the present invention according to claim 5 is the power generating plant according to claim 4, characterized in that the gasification equipment is equipment for burning a solid fuel to generate the CO gas-containing gas as the anode gas.

According to the above feature, a solid fuel, for example, coal or biomass, can be burned by the gasification equipment to produce the CO gas-containing gas as the anode gas.

The power generating plant of the present invention according to claim 6 is the power generating plant according to claim 5, characterized in that the solid fuel burned in the gasification equipment is coal.

According to the above feature, coal can be burned by the gasification equipment (gasification furnace) to produce the CO gas-containing gas as the anode gas.

The power generating plant of the present invention according to claim 7 is the power generating plant according to any one of claims 2 to 6, comprising: a combustor for burning a cathode exhaust of the cathode and an anode exhaust of the anode; a turbine for expanding a combustion gas from the combustor to obtain power; waste heat recovery equipment which performs heat recovery of an exhaust from the turbine to generate steam, expands the steam to drive a turbine and obtain power, and cools the exhaust subjected to the heat recovery for separation into water and a $CO_2$ gas; and a $CO_2$ compressor for compressing the $CO_2$ gas separated by the waste heat recovery equipment and pressure-feeding the compressed $CO_2$ gas to the cathode.

According to the above feature, the exhaust from the molten carbonate fuel cell is burned, and expanded by the turbine, whereby power can be obtained. The exhaust gas from the turbine can be subjected to heat recovery by the waste heat recovery equipment to separate and recover $CO_2$, and the $CO_2$ can be pressurized by the $CO_2$ compressor for use as the cathode gas.

The power generating plant according to claim 8 is the power generating plant according to any one of claims 2 to 7, characterized in that the cathode gas generation means includes an oxygen supply system for supplying pure oxygen at a predetermined pressure, and the molten carbonate fuel cell is operated while being supplied with $CO_2$ and oxygen at a predetermined stoichiometric ratio.

According to the above feature, there can be provided the power generating plant equipped with the molten carbonate fuel cell which can be operated while being supplied with, a desired amount of oxygen at a desired oxygen/$CO_2$ ratio.

The power generating plant according to claim 9 is the power generating plant according to claim 8, characterized in that the pure oxygen at the predetermined pressure supplied by the oxygen supply system is oxygen produced upon concentration of a nitrogen gas by pressure swing adsorption to remove the nitrogen gas from air, and oxygen obtained by a cryogenic separation method.

According to the above feature, there can be constructed the power generating plant equipped with the molten carbonate fuel cell which can easily obtain oxygen in a pressurized state and obviate the need to have equipment for pressurizing oxygen.

The power generating plant of the present invention according to claim 10, intended for attaining the aforementioned object, is a power generating plant, comprising: a coal gasification furnace for burning coal to obtain a fuel gas; gas treatment means for converting the fuel gas obtained by the coal gasification furnace into a desired CO gas-containing gas; shift reaction means for subjecting the CO gas-containing gas obtained by the gas treatment means to a chemical reaction to form $H_2$ and $CO_2$; a molten carbonate fuel cell which has an anode supplied with an anode gas containing $H_2$ obtained by the shift reaction means, which has a cathode supplied with a cathode gas containing pure oxygen and a $CO_2$ gas, and which performs power generation by an electrochemical reaction between the anode gas and the cathode gas; a combustor for burning a cathode exhaust of the cathode and an anode exhaust of the anode; a turbine for expanding a combustion gas from the combustor to obtain power; waste heat recovery equipment which performs heat recovery of an exhaust from the turbine to generate steam, drives a steam turbine to obtain power, and cools the exhaust subjected to the heat recovery for separation into water and a $CO_2$ gas; a $CO_2$ compressor for compressing the $CO_2$ gas separated by the waste heat recovery equipment and pressure-feeding the compressed $CO_2$ gas to the cathode; and an oxygen supply system for supplying pure oxygen at a predetermined pressure to the $CO_2$ gas compressed by the $CO_2$ compressor, and wherein the gas treatment means comprises gas cooling means for cooling the fuel gas obtained by the coal gasification furnace with the water separated by the waste heat recovery equipment, desulfurization means for desulfurizing the fuel gas cooled by the gas cooling means to form the desired CO gas-containing gas, and a steam supply system for supplying steam, which has been obtained by cooling the gas by the gas cooling means, to the CO gas-containing gas desulfurized by the desulfurization means, and the power generating plant further comprising heating-up means for supplying the cathode exhaust to the cathode gas containing pure oxygen and a $CO_2$ gas on an inlet side of the cathode to raise a temperature of the cathode gas.

According to the above feature, coal is reacted in the coal gasification furnace to produce the CO gas-containing gas as the anode gas. The CO gas-containing gas is subjected to an exothermic reaction by the shift reaction means to form $H_2$ and $CO_2$. Thus, heat buildup of the molten carbonate fuel cell is inhibited (its relative cooling is performed), and a desired anode gas is obtained in the absence of an extra heat source and a heat exchange source. In the molten carbonate fuel cell, power generation is carried out by an electrochemical reaction between the $H_2$-containing anode gas obtained by the shift reaction means and the cathode gas containing pure oxygen and $CO_2$ gas. The exhaust from the molten carbonate fuel cell is burned by the combustor, and the resulting combustion gas is expanded in the turbine to perform power generation. The exhaust from the turbine is subjected to heat recovery and cooling in the waste heat recovery equipment to separate a $CO_2$ gas. The separated $CO_2$ gas is compressed by the $CO_2$ compressor, and the compressed $CO_2$ gas is pressure-fed, together with pure oxygen at a predetermined pressure, to the cathode.

In producing the CO gas-containing gas as the anode gas, the fuel gas is cooled with water separated by the waste heat recovery equipment (gas cooling means) The cooled gas is turned into the desired CO gas-containing gas by the desulfurization means, and the resulting CO gas-containing gas is supplied with steam by the steam supply system, followed by reaction in the shift reaction means. Moreover, the cathode exhaust is supplied to the cathode gas containing pure oxygen and $CO_2$ gas on the inlet side of the cathode to raise the temperature of the cathode gas (heating-up means).

The shift reaction means is provided outside the molten carbonate fuel cell, and an exothermic reaction is performed there to inhibit the heat buildup of the molten carbonate fuel cell (cool it relatively). Thus, the amount of the cathode gas used to cool the molten carbonate fuel cell can be decreased (or eliminated in some cases) and the power generating plant can be operated, with pure oxygen and $CO_2$ gas being in minimal amounts necessary for the power generating reaction.

Thus, it becomes possible to construct the power generating plant equipped with the molten carbonate fuel cell capable of using a coal gasification fuel substantially containing a CO gas, while inhibiting the heat buildup of the MCFC and maintaining its performance, with a cut in $CO_2$ being taken into consideration The power generating plant of the present invention according to claim 11 is the power generating plant according to claim 10, comprising a plurality of the shift reaction means provided in parallel downstream of the steam supply system.

According to the above feature, the plurality of the shift reaction means can be operated alternately, whereby maintenance can be performed, with continuous operation being ensured.

EFFECTS OF THE INVENTION

The power generating plant of the present invention can be provided as a power generating plant equipped with a molten carbonate fuel cell capable of using a CO gas-containing gas, which is a gas substantially containing a CO gas, especially, a coal gasification fuel, while giving consideration to the reduction of $CO_2$, with the performance of the molten carbonate fuel cell (MCFC) being maintained.

BRIEF DESCRIPTION OF THE DRAWINGS

[FIG. 2] is a tabular drawing showing an example of the output status of each instrument

[FIG. 3] is a tabular drawing showing an example of the breakdown of calorific values.

[FIG. 4] is a tabular drawing showing an example of the breakdown of heat losses.

BEST MODE FOR CARRYING OUT THE INVENTION

Figure 1:
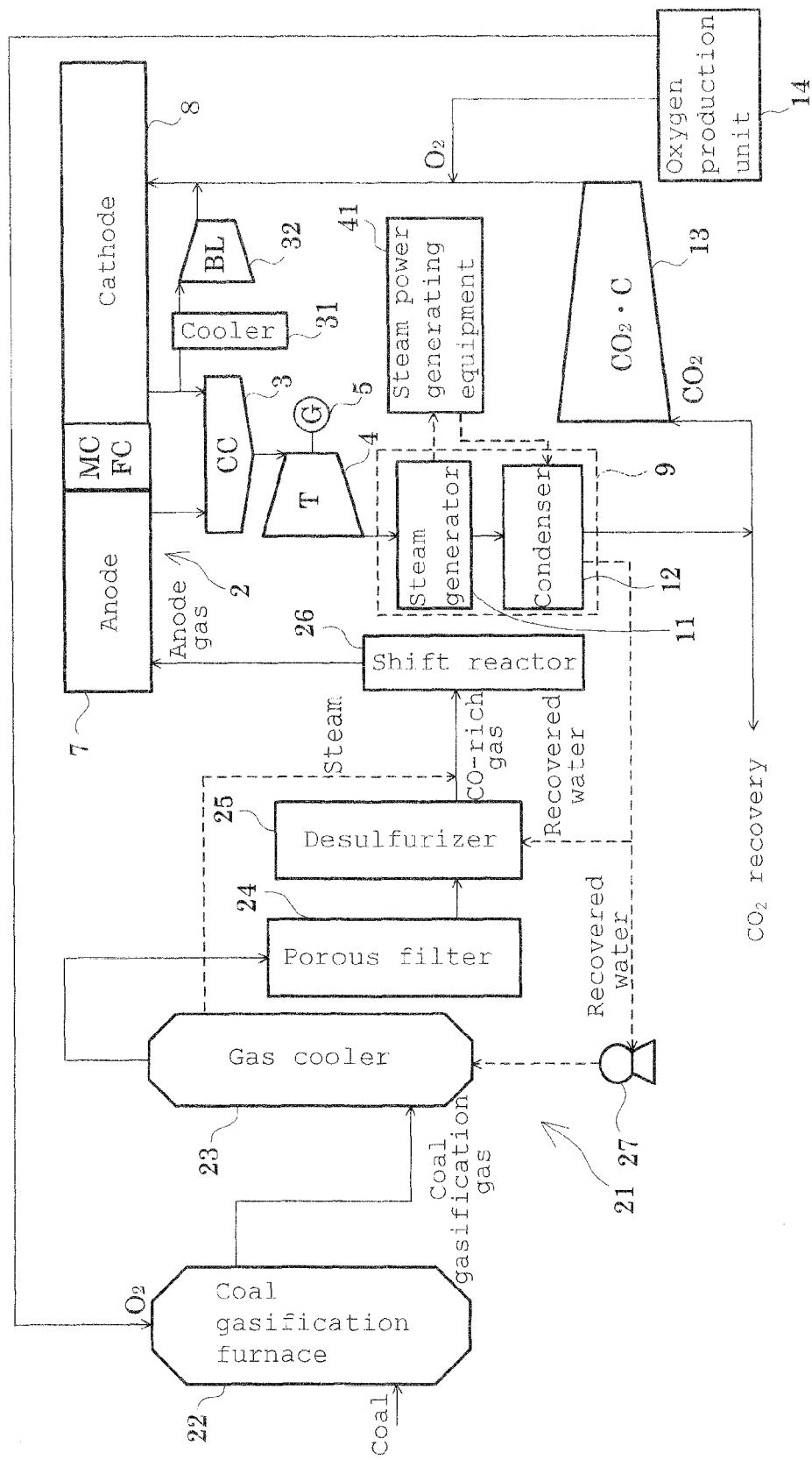
[FIG. 1] is a schematic system diagram of a power generating plant according to an embodiment of the present invention.

In the power generating plant according to the embodiment of the present invention, a coal gasification fuel gas obtained by burning coal in a coal gasification furnace is desulfurized to form a CO gas-containing gas substantially containing a CO gas. The CO gas-containing gas is converted into $H_2$ and $CO_2$ by a chemical reaction in a shift reaction means to obtain an anode gas heated to a desired temperature by an exothermic reaction. This anode gas is supplied to an anode of a molten carbonate fuel cell (MCFC). A cathode of the MCFC is supplied with pure oxygen and a $CO_2$ gas as a cathode gas.

The cathode gas supplied to the cathode is a gas containing pure oxygen and a $CO_2$ gas. It is preferred for this cathode gas to be operated in a minimum amount of use (a minimum amount necessary for a power generating reaction) in order to reduce a loss in oxygen production power or the like, cut down on the power of a cathode circulating blower, and suppress gas leakage caused by maintaining the pressure loss of the cathode gas at a low value. The shift reaction means is provided outside the molten carbonate fuel cell, and an exothermic reaction is performed there (cooling function means) to inhibit the heat buildup of the molten carbonate fuel cell (cool the molten carbonate fuel cell relatively). By so doing, the amount of the cathode gas used to cool the molten carbonate fuel cell can be decreased (or eliminated in some cases), and the power generating plant can be operated, with pure oxygen and $CO_2$ gas being in minimal amounts necessary for the power generating reaction, namely, with the loss in the oxygen production power or the like being reduced.

Thus, a $CO_2$ gas obtained by condensation of the exhaust gas from the MCFC can be recovered, and used as the anode gas, so that the plant giving consideration to the circulation of $CO_2$ is constructed. Since the anode gas heated to the desired temperature by the exothermic reaction of the shift reaction means is obtained, the exothermic reaction in the shift reaction means can be utilized as a means of heating the fuel. Thus, it becomes possible to construct a simple system devoid of a gas/gas heat exchanger requiring a heat source for heating. In this manner, the performance of the MCFC can be maintained, without using power for heating, and without taking a measure, such as circulating the exhaust gas for cooling the anode gas.

Moreover, the generation of hydrogen with the use of the shift reaction means obviates the necessity for cooling the cell by an amount corresponding to the amount of heat buildup by the shift reaction, in comparison with the conventional case where the shift reaction is caused to occur within the molten carbonate fuel cell (MCFC). Furthermore, the shift reaction means can be constructed from simple equipment having a catalytic substance placed within piping. Even if desulfurization or the like is insufficient on the upstream side, foreign matter can be adsorbed to some extent by the catalyst accommodated within the shift reaction means. In this respect as well, factors aggravating the performance of the MCFC can be avoided to maintain performance.

The first embodiment will be described concretely.

FIG. 1 shows the schematic system of the power generating plant according to the embodiment of the present invention.

As shown in the drawing, the power generating plant according to the present embodiment is equipped with a molten carbonate fuel cell (MCFC) 2, and is provided with a combustor 3 into which an outlet gas (exhaust gas) of the MCFC 2 is introduced for combustion. A turbine 4 driven upon expansion of a combustion gas from the combustor 3 is provided, and a power generator 5 is provided coaxially on the turbine 4. The driving of the turbine 4 actuates the power generator 5 to carry out power generation.

The MCFC 2 is constructed by interposing an electrolyte (carbonate) between a fuel electrode (anode) 7 formed from a nickel porous material, for example, and an air electrode (cathode) 8 formed from a nickel oxide porous material, for example. Hydrogen ($H_2$) obtained from a coal gasification gas is supplied to the anode 7, and air ($O_2$) and $CO_2$ are supplied to the cathode 8, whereby power generation is performed by an electrochemical reaction between $H_2$ and $O_2$ A waste heat recovery means (heat recovery steam generator) 9 for performing heat recovery of an exhaust (exhaust gas) after finishing work in the turbine 4 is provided downstream of the turbine 4. The waste heat recovery means 9 is equipped with a steam generator 11 and a condenser 12. To the condenser 12 of the waste heat recovery means 9; feed water from steam power generating equipment 41, for example, condensate formed by condensation of steam having finished work in a steam turbine, is fed as a cooling medium (for feed water heating) The exhaust gas, which has been subjected to heat recovery in the steam generator 11, is condensed by the condenser 12 to be separated into water ($H_2O$) and a non-condensable gas ($CO_2$). Steam generated by the steam generator 11 is fed to the steam power generating equipment 41 to drive the steam turbine, thereby obtaining power.

$CO_2$ separated by the condenser 12 is compressed by a $CO_2$ compressor 13, and an oxygen production unit 14 is provided as an oxygen supply system for supplying pure $O_2$ at a predetermined pressure to the $CO_2$ compressed by the $CO_2$ compressor 13. The pure $O_2$ at the predetermined pressure is supplied to the $CO_2$ compressed by the $CO_2$ compressor 13 to generate a cathode gas (cathode gas generation means) and the cathode gas is supplied to the cathode 8 of the MCFC 2.

The oxygen production unit 14 is adapted to concentrate a nitrogen gas by pressure swing adsorption and thereby remove it from air, thereby producing $O_2$ (PSA mode). As the oxygen supply system, it is possible to adopt a means by which to pressurize pure $O_2$ from deep-freezing equipment at a predetermined pressure and supply it. By supplying a desired amount of $O_2$ from the oxygen production unit 14, a power generating plant having the MCFC 2 capable of operating at a desired ratio of $O_2$ to $CO_2$ becomes feasible.

On the other hand, an anode gas generation means 21, which generates a CO gas-containing gas substantially containing a CO gas as an anode gas, is provided. The anode gas generated by the anode gas generation means 21 is supplied to the anode 7 of the MCFC 2.

The anode gas generation means 21 is equipped with a coal gasification furnace 22 as gasification equipment for burning coal, as a solid fuel, together with pure $O_2$ obtained by the oxygen production unit 14 to obtain a fuel gas. A coal gasification gas obtained by the coal gasification furnace 22 is cooled by a gas cooler 23, then passed through a porous filter 24, and desulfurized by a desulfurizer 25 (gas treatment means) The coal gasification gas desulfurized by the desulfurizer 25 (i.e., CO gas-containing gas: CO-rich gas) is subjected to a chemical reaction (exothermic reaction) in a shift reactor 26 (shift reaction instrument) as a shift reaction means to be converted into $H_2$ and $CO_2$. A desired anode gas obtained in this manner is supplied to the anode 7 of the MCFC 2.

That is, the shift reactor 26 is provided outside the MCFC 2 to carry out the exothermic reaction there, whereby the heat buildup of the MCFC 2 is inhibited (relatively cooled: cooling function means). If foreign matter remains in the coal gasification gas (CO gas-containing gas) after desulfurization, the foreign matter can be trapped by the shift reactor 26.

The shift reactor 26 has a desired catalyst disposed within piping through which the coal gasification gas (CO gas-containing gas) flows. In the shift reactor 26, the CO gas-containing gas is converted into $H_2$ and $CO_2$ by the exothermic reaction to form the anode gas containing $H_2$ (desired anode gas) for use in an electrochemical reaction. That is, in the shift reactor 26, the exothermic reaction $CO+H_2O \rightarrow H_2+CO_2$ is carried out.

The shift reactor 26 can be configured to have the desired catalyst directly disposed within the piping, or to have a reticulated member provided within the piping and have the desired catalyst disposed on the reticulated member.

Since $H_2$ is obtained by the exothermic reaction, the anode gas containing $H_2$ can be supplied to the anode 7 of the MCFC 2, without using a heat exchanger (gas/gas heat exchanger) for raising the temperature of the anode gas to a desired temperature, that is, without requiring heat from other instruments.

Thus, the temperature of the anode gas can be maintained at the desired temperature by maintaining calorific value. Accordingly, the anode gas can be obtained in the absence of an extra heat source for heat exchange or a cooling source (circulation of the anode exhaust gas, etc.) for adjusting the temperature of the anode gas, and in a state where no radiant heat occurs.

Furthermore, heat generation by the shift reaction, which has so far occurred within the MCFC 2, is performed outside the MCFC 2. Thus, cooling of the MCFC 2 is not needed by an amount corresponding to the heat generation due to the shift reaction. As a result, cooling power of the cell by the cathode gas is cut down. That is, the cathode gas supplied to the cathode 8 is a gas containing pure oxygen and a $CO_2$ gas, and is preferably operated in a minimum amount of use (a minimum amount necessary for a power generating reaction) in order to reduce a loss in the oxygen production unit 14. Even if it is necessary to circulate the cathode gas, the minimum amount is preferred for reducing blower power 32. By performing heat generation due to the shift reaction outside the MCFC 2, heat buildup of the MCFC 2 is inhibited (MCFC 2 is relatively cooled), and the amount of the cathode gas used to cool the MCFC 2 can be decreased. In other words, pure oxygen and $CO_2$ gas may be in minimum amounts required for the power generating reaction, meaning that losses in the oxygen production unit 14 can be reduced.

The desulfurizer 25 of the anode gas generation means 21 is a wet type device, and accepts part of condensate (recovered water) condensed by the condenser 12 of the aforementioned waste heat recovery means 9. The condensate (recovered water) condensed by the condenser 12 is fed to the gas cooler 23 by a pump 27, and used as a medium for cooling the coal gasification gas. The condensate (recovered water) is heated by heat exchange in the gas cooler 23 to be turned into steam, which is supplied to the coal gasification gas (CO gas-containing gas) desulfurized by the desulfurizer 25 (steam supply system). A surplus part of $CO_2$ separated by the condenser 12 of the waste heat recovery means 9 is recovered to the outside.

A cooler 31 is provided for cooling a part of the cathode exhaust from the MCFC 2, which is fed to the combustor 3. The cathode exhaust cooled by the cooler 31 is supplied to the cathode gas on the inlet side of the cathode 8 (i.e., cathode gas containing pure $O_2$ and $CO_2$ gas) by a blower 32 as a heating-up means, whereby the cathode gas is heated to a desired temperature. It is also possible to provide an ejector instead of the blower 32. Thus, the cathode gas can be supplied to the cathode 8 of the MCFC 2, without the need to use a heat exchanger (gas/gas heat exchanger) for heating the cathode gas to the desired temperature The anode gas is heated by the shift reactor 26, and the cathode gas is heated by the circulation of the cathode exhaust. Thus, a heat exchanger (gas/gas heat exchanger) need not be provided in the MCFC 2, so that an installation space for instruments can be saved to increase the degree of freedom of design and achieve compactness.

As a result, even when the MCFC 2 is supplied with $CO_2$ and $O_2$ as the cathode gas such that the amount of the cathode gas is kept to a minimum, the present plant is decreased in the quantity of heat necessary for cooling. This plant can obtain the anode gas and the cathode gas without influencing the capability or performance of the MCFC 2.

With the above-described power generation plant, coal is reacted in the coal gasification furnace 22 to produce the coal gasification gas. The coal gasification gas is cooled in the gas cooler 23, passed through the porous filter 24, and desulfurized by the desulfurizer 25 to produce the CO gas-containing gas as the anode gas. The CO gas-containing gas is converted into $H_2$ and $CO_2$ by the exothermic reaction in the shift reactor 26, and the anode gas containing $H_2$ is supplied to the anode 7 of the MCFC 2. In the MCFC 2, power generation is performed by the electrochemical reaction between the anode gas containing $H_2$ and the cathode gas containing pure oxygen and $CO_2$ gas.

Thus, the desired anode gas can be obtained from the coal gasification gas in the absence of an extra heat source and a heat exchange source.

The exhaust from the MCFC 2 is burned by the combustor 3, and expanded by the turbine 4 so that power generation is performed by the power generator 5. The exhaust from the turbine 4 is subjected to heat recovery by the steam generator 11 of the waste heat recovery means 9, and cooled by the condenser 12 to be separated into a $CO_2$ gas and water. The separated $CO_2$ gas is compressed by the $CO_2$ compressor 13, and pressure fed as the cathode gas, together with pure $O_2$ from the oxygen production unit 14, to the cathode 8. The exhaust from the cathode is cooled, and supplied in circulation to the cathode gas by the blower 32, whereby the cathode gas is maintained at the desired temperature.

Since the cathode gas is composed of a $CO_2$ gas and pure $O_2$, its flow rate is limited. In order to maintain the performance of the MCFC 2, it is necessary to avoid the use of the cathode gas for other cooling, such as the cooling of the anode gas. With the above-mentioned power generating plant, the anode gas is subjected to the exothermic reaction in the shift reactor 26. Since a heat source from other instrument is absent, its cooling is not necessary. Even when the cathode gas composed of a $CO_2$ gas and pure $O_2$ is applied (even when the cathode gas at a limited flow rate is used), therefore, it is possible to construct a plant taking a $CO_2$ decrease into consideration while inhibiting the heat buildup of the MCFC 2 and maintaining its performance.

That is, heat generation due to the shift reaction is performed outside the MCFC 2, so that heat buildup of the MCFC 2 is inhibited (MCFC 2 is relatively cooled), and the amount of the cathode gas used to cool the MCFC 2 can be decreased. In other words, pure oxygen and $CO_2$ gas can be in minimum amounts required for the power generating reaction, meaning that losses in the oxygen production unit 14 can be reduced. Under these conditions, the MCFC 2 can be operated. Even if the circulation 32 of the cathode gas is necessary, the MCFC 2 can be operated, with the power for the circulation being restricted.

In generating the CO gas-containing gas as the anode gas, water separated from the fuel gas by the condenser 12 of the waste heat recovery means 9 (i.e. recovered water) is fed to the gas cooler 23 by the pump 27 to cool the coal gasification gas, which is turned into the desired CO gas-containing gas (CO-rich gas) by the desulfurizer 25. The CO-rich gas is supplied with steam obtained by the gas cooler 23, and is fed to the shift reactor 26.

Because of the above features, the power generating plant equipped with the MCFC 2 is achieved which can use the coal gasification fuel substantially containing a CO gas, while maintaining the performance of the MCFC, and recovering the total amount of $CO_2$, with the circulation of $CO_2$ being taken into consideration, without need for new power.

The foregoing power generating plant is capable of operation with a net electrical efficiency of 55% to 60%. Examples of provision of electrical efficiency will be concretely explained based on FIGS. 2 to 4. FIG. 2 shows an example of the output status of each instrument. FIG. 3 shows an example of the breakdown of calorific values. FIG. 4 shows an example of the breakdown of heat losses. Examples of the numerical values shown in these drawings represent trial calculation values obtained on the assumption that the respective instruments were applied to the actual plant. These examples are quantitative explanations for the efficiency of the power generating plant according to the present invention. Thus, when the actual plant is applied, the numerical values change according to the disposition of the instruments and the types of the instruments applied However, the overall trends of the values are (roughly) comparable, and a net electrical efficiency of 55% to 60% as the total efficiency can be ensured.

As shown in FIG. 1 and FIGS. 2 to 4, assume that the calorific value of the coal charged is 100%, reaction resistance in the cathode 8 is minimal because of use of $CO_2$ and $O_2$ as the cathode gas, and an operating current density is set at 2000 $A/m^2$. In this case, unit cell voltage shows 920 mV. Since the unit cell voltage is high., the output of the MCFC 2 is 44.75% (see FIG. 3). The anode exhaust gas and cathode exhaust gas of the MCFC 2 are mixed and then burned in the combustor 3 to form a combustion gas of the order of 900° C., which drives the turbine 4.

The output of the turbine 4 is 9.54% (see FIG. 3). The output of the turbine 4 is a value obtained by subtracting the power of the compressor 13 from the output in the turbine 4, and then multiplying the difference by the efficiency of the power generator 5. The exhaust gas discharged from the turbine 4 maintains a temperature of the order of 500° C. The steam turbine of the steam power generating equipment 41 is driven by steam generated by the heat source which is the exhaust gas, and the heat sources which are the steam generator (gas cooler) 11 provided in the circulation flow path of the cathode, and the gas cooler 23 for the coal gasification gas. The output of the steam turbine is 12.24% (see FIG. 3). These values represent the gross conversion efficiency as the rate of conversion from coal into power, and the total output is 66.53%.

Of the electricity generated from the coal, 3.59% is consumed as the oxygen production power for gasification (see FIG. 4), and 5.57% is consumed as the oxygen production power for the cathode gas (power of the oxygen production unit 14; see FIG. 4). Moreover, 0.28% is consumed by the pump for the steam turbine (see FIG. 4), and 2% is consumed as the power of the accessories of the entire plant (see FIG. 4). The other losses shown in FIG. 4 include the heat dissipation of the MCFC 2, the inverter loss, the power generator loss, and condensation loss, etc. These losses are discarded as heat to the outside air.

The values of the heat losses (power losses) are all percentages on the quantity of heat of the coal charged. When these power losses are subtracted from the sum of the outputs of the MCFC 2, the turbine 4, and the steam turbine, the difference is 55%. The values used in calculating 55% are the known values obtained in the past by operation of the existing instruments. Since technologies advance day by day, and the optimization of the operating conditions is also upgraded on a daily basis, it can be said that 55% is the minimum value. Hence, it is possible to achieve a higher value of the electrical efficiency (e.g., 60%) without changing the operating conditions for the MCFC 2, the turbine 4, and the steam turbine.

In the above-mentioned power generating plant, a plurality of the shift reactors 26 can be provided in parallel downstream of the desulfurizer 25, and the CO-rich gas can be switched by valves. By so doing, the plurality of the shift reactors 26 can be operated alternately, and the shift reactors 26 out of operation can be subjected to maintenance, with continuous operation being kept and without cost increases.

In the above embodiment, the anode gas generation means 21 for generating the CO gas-containing gas substantially containing a CO gas as the anode gas is described, with the use of the coal gasification fuel obtained by combustion of coal being taken as an example. However, gasification equipment for obtaining a gasification gas by burning biomass as a solid fuel can be used as the anode gas generation means. Aside from the solid fuel, a liquid fuel such as light oil, gasoline, or an alcohol, e.g., methanol or ethanol, can be used as the fuel for obtaining the CO gas-containing gas substantially containing a CO gas.

Besides, the turbine 4 is driven by the exhaust gas of the MCFC 2, the exhaust gas from the turbine 4 is cooled to separate and recover a $CO_2$ gas, and the separated and recovered $CO_2$ gas is used as the cathode gas. In this manner, a closed-cycle plant is constructed in the present embodiment. However, it is possible to construct a plant in which the exhaust gas from the MCFC 2 is separately recovered, and a $CO_2$ gas from other equipment is used as the cathode gas.

INDUSTRIAL APPLICABILITY

The present invention can be utilized in the industrial field of a power generating plant equipped with a molten carbonate fuel cell which obtains electric power by an electrochemical reaction between hydrogen and oxygen.

The invention claimed is:

1. A power generating plant, comprising:
   a coal gasification furnace that burns coal to obtain a fuel gas;
   a gas treatment unit that converts the fuel gas obtained by the coal gasification furnace into a desired CO gas-containing gas;
   a shift reaction unit that subjects the CO gas-containing gas obtained by the gas treatment unit to a chemical reaction to form $H_2$ and $CO_2$;
   a molten carbonate fuel cell which has an anode supplied with an anode gas containing $H_2$ obtained by the shift reaction unit, which has a cathode supplied with a cathode gas containing pure oxygen and a $CO_2$ gas, and which performs power generation by an electrochemical reaction between the anode gas and the cathode gas;
   a combustor for burning a cathode exhaust of the cathode and an anode exhaust of the anode;
   a turbine for expanding a combustion gas from the combustor to obtain power;
   waste heat recovery equipment which performs heat recovery of an exhaust from the turbine to generate steam, drives a steam turbine to obtain power, and cools the exhaust subjected to the heat recovery for separation into water and a $CO_2$ gas;
   a $CO_2$ compressor for compressing the $CO_2$ gas separated by the waste heat recovery equipment and pressure-feeding the compressed $CO_2$ gas to the cathode; and
   an oxygen supply system for supplying pure oxygen at a predetermined pressure to the $CO_2$ gas compressed by the $CO_2$ compressor, and
   wherein the gas treatment unit comprises:
   a gas cooling unit that cools the fuel gas obtained by the coal gasification furnace with the water separated by the waste heat recovery equipment,
   a desulfurization unit that desulfurizes the fuel gas cooled by the gas cooling unit to form the desired CO gas-containing gas, and
   a steam supply system for supplying steam, which has been obtained by cooling the gas by the gas cooling unit, to the CO gas-containing gas desulfurized by the desulfurization unit, and
   the power generating plant further comprising:
   a heating-up unit that supplies the cathode exhaust to the cathode gas containing pure oxygen and a $CO_2$ gas on an inlet side of the cathode to raise a temperature of the cathode gas.

2. The power generating plant according to claim 1, comprising:
   a plurality of the shift reaction units provided in parallel downstream of the steam supply system.

* * * * *